United States Patent
Youn et al.

(10) Patent No.: US 6,911,668 B2
(45) Date of Patent: Jun. 28, 2005

(54) ARRAY SUBSTRATE FOR IN-PLANE SWITCHING MODE LIQUID CRYSTAL DISPLAY DEVICE

(75) Inventors: Jae Hyoung Youn, Seoul (KR); Gue Tai Lee, Youngcheon-si (KR)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/315,117

(22) Filed: Dec. 10, 2002

(65) Prior Publication Data

US 2003/0107037 A1 Jun. 12, 2003

(30) Foreign Application Priority Data

Dec. 11, 2001 (KR) .................................... 2001-0078247

(51) Int. Cl.[7] ....................... H01L 29/04; H01L 31/036; H01L 31/0736; H01L 31/20
(52) U.S. Cl. ............................. 257/59; 257/72; 349/42; 349/110; 349/123; 349/124; 349/129; 349/138; 349/139; 349/141; 349/142; 349/143; 349/144; 349/147
(58) Field of Search ....................... 257/59, 72; 349/42, 349/110, 123–124, 129, 138, 139, 141, 142–144, 147

(56) References Cited

U.S. PATENT DOCUMENTS

| 5,598,285 A | 1/1997 | Kondo et al. ................. 349/39 |
| 5,745,207 A | 4/1998 | Asada et al. ................ 349/141 |
| 5,838,037 A | 11/1998 | Masutani et al. ........... 257/296 |

(Continued)

FOREIGN PATENT DOCUMENTS

| JP | 09-005764 | * | 1/1997 |
| JP | 09-073101 | * | 3/1997 |
| JP | 09-101538 | * | 4/1997 |
| JP | 09-105908 | * | 4/1997 |

OTHER PUBLICATIONS

R. Kieler et al.; "In–Plane Switching of Nematic Liquid Crystals"; Japan Display '92; pp. 547–550.

M. Oh–e, et al.; "Principles and Characteristics of Electro–Optical Behaviour with In–Plane Switching Mode"; Asia Display '95; pp. 577–580.

M. Ohta et al.; "Development of Super–TFT–LCDs with In–Plane Switching Display Mode"; Asia Display '95; pp. 707–710.

S. Matsumoto et al.; Display Characteristics of In–Plane Switching (IPS) LCDs and a Wide–Viewing–Angle 14.5–in. OPS TFT–LCD; Euro Display '96; pp. 445–448.

H. Wakemoto et al.; "An Advanced In–Plane Switching Mode TFT–LCD"; SID 97 Digest; pp. 929–932.

(Continued)

*Primary Examiner*—Amir Zarabian
*Assistant Examiner*—Ida M. Soward
(74) *Attorney, Agent, or Firm*—McKenna Long & Aldridge LLP (57) ABSTRACT

An array substrate for use in an in-plane switching liquid crystal display device has a plurality of common electrodes and a plurality of pixel electrodes. One of the common electrodes is formed at the same time with the plurality of pixel electrodes using a transparent conductive material. This transparent common electrode is connected to other common electrode through a common electrode connector. Therefore, aperture ratio can be increased. Further in the present invention, a capacitor electrode is disposed over the common line and then forms a first storage capacitor with a portion of the common line, and a pixel electrode connector is disposed over the gate line and then forms a second storage capacitor with a portion of the gate line. As a result, the IPS-LCD device can obtain an improved and stable capacitance from the two storage capacitors.

21 Claims, 8 Drawing Sheets

U.S. PATENT DOCUMENTS

| | | | |
|---|---|---|---|
| 5,946,060 A | | 8/1999 | Nishiki et al. ............... 349/48 |
| 5,969,781 A | * | 10/1999 | Matsuyama et al. ........ 349/130 |
| 5,990,987 A | | 11/1999 | Tanaka ........................ 349/43 |
| 6,028,653 A | | 2/2000 | Nishida ...................... 349/141 |
| 6,064,451 A | * | 5/2000 | Oh et al. ..................... 349/40 |
| 6,097,454 A | | 8/2000 | Zhang et al. ................ 349/43 |
| 6,133,977 A | * | 10/2000 | Lee et al. ................... 349/141 |
| 6,292,237 B1 | * | 9/2001 | Hebiguchi .................. 349/39 |
| 6,388,727 B1 | * | 5/2002 | Kim et al. ................. 349/141 |
| 6,506,617 B1 | * | 1/2003 | Cheng ........................ 438/22 |
| 6,507,383 B1 | * | 1/2003 | Abe et al. .................. 349/141 |
| 6,583,839 B2 | * | 6/2003 | Suzuki et al. .............. 349/141 |
| 6,661,492 B2 | * | 12/2003 | Kim ........................... 349/141 |
| 6,680,772 B2 | * | 1/2004 | Lee ............................ 349/141 |
| 2001/0013915 A1 | * | 8/2001 | Song .......................... 349/141 |
| 2001/0013916 A1 | * | 8/2001 | Youn et al. ................. 349/143 |
| 2001/0015784 A1 | * | 8/2001 | Gu ............................. 349/141 |
| 2001/0040651 A1 | * | 11/2001 | Toko .......................... 349/86 |
| 2001/0046020 A1 | * | 11/2001 | Cho ........................... 349/141 |
| 2002/0008821 A1 | * | 1/2002 | Lee et al. ................... 349/139 |
| 2002/0008827 A1 | * | 1/2002 | Yoo et al. ................... 349/141 |
| 2002/0057411 A1 | * | 5/2002 | Kim et al. .................. 349/141 |
| 2002/0063835 A1 | * | 5/2002 | Kim ........................... 349/141 |
| 2002/0089631 A1 | * | 7/2002 | Lee et al. ................... 349/141 |
| 2002/0130324 A1 | * | 9/2002 | Song et al. ................. 257/72 |
| 2004/0095543 A1 | * | 5/2004 | Ko et al. .................... 349/141 |

OTHER PUBLICATIONS

S.H. Lee et al.; High–Transmittance, Wide–Viewing–Angle Nematic Liquid Crystal Display Controlled by Fringe–Field Switching; Asia Display '98; pp. 371–374.

S. Endoh et al.; Diagonal Super–TFT–LCDs with Mega Wide Viewing Angle and Fast Response Speed of 20ms; IDW '99; pp. 187–190.

* cited by examiner

*(RELATED ART)*

ARRAY SUBSTRATE FOR IN-PLANE SWITCHING MODE LIQUID CRYSTAL DISPLAY DEVICE

This application claims the benefit of Korean Patent Application No. 2001-0078247, filed on Dec. 11, 2001, which is hereby incorporated by reference as if fully set forth herein.

BACKGROUND OF THE INVENTION

1. Field of the Invention

The present invention relates to liquid crystal display devices. More particularly it relates to liquid crystal display devices implenting in-plane switching (IPS) where an electric field to be applied to liquid crystals is generated in a plane parallel to a substrate.

2. Discussion of the Related Art

A liquid crystal display device uses the optical anisotropy and polarization properties of liquid crystal molecules to produce an image. Liquid crystal molecules have a definite orientational alignment as a result of their long, thin shapes. That alignment direction can be controlled by an applied electric field. In other words, as an applied electric field changes, so does the alignment of the liquid crystal molecules. Due to the optical anisotropy, the refraction of incident light depends on the alignment direction of the liquid crystal molecules. Thus, by properly controlling an applied electric field, a desired light image can be produced.

Of the different types of known liquid crystal displays (LCDs), active matrix LCDs (AM-LCDs), which have thin film transistors (TFTs) and pixel electrodes arranged in a matrix form, are the subject of significant research and development because of their high resolution and superiority in displaying moving images.

LCD devices have wide application in office automation (OA) equipment and video units because they are light and thin and have low power consumption characteristics. The typical liquid crystal display panel has an upper substrate, a lower substrate and a liquid crystal layer interposed therebetween. The upper substrate, commonly referred to as a color filter substrate, usually includes a common electrode and color filters. The lower substrate, commonly referred to as an array substrate, includes switching elements, such as thin film transistors and pixel electrodes.

As previously described, LCD device operation is based on the principle that the alignment direction of the liquid crystal molecules is dependent upon an electric field applied between the common electrode and the pixel electrode. Thus, the alignment direction of the liquid crystal molecules is controlled by the application of an electric field to the liquid crystal layer. When the alignment direction of the liquid crystal molecules is properly adjusted, incident light is refracted along the alignment direction to display image data. The liquid crystal molecules function as an optical modulation element having variable optical characteristics that depend upon polarity of the applied voltage.

In a conventional LCD device, since the pixel and common electrodes are positioned on the lower and upper substrates, respectively, the electric field induced between them is perpendicular to the lower and upper substrates. However, the conventional LCD devices having the longitudinal electric field have a drawback in that they have a very narrow viewing angle. In order to solve the problem of narrow viewing angle, in-plane switching liquid crystal display (IPS-LCD) devices have been proposed. The IPS-LCD devices typically include a lower substrate where a pixel electrode and a common electrode are disposed, an upper substrate having no electrode, and a liquid crystal interposed between the upper and lower substrates. A detailed explanation about operation modes of a typical IPS-LCD panel will be provided referring to FIGS. 1, 2A, and 2B.

Figure 1:
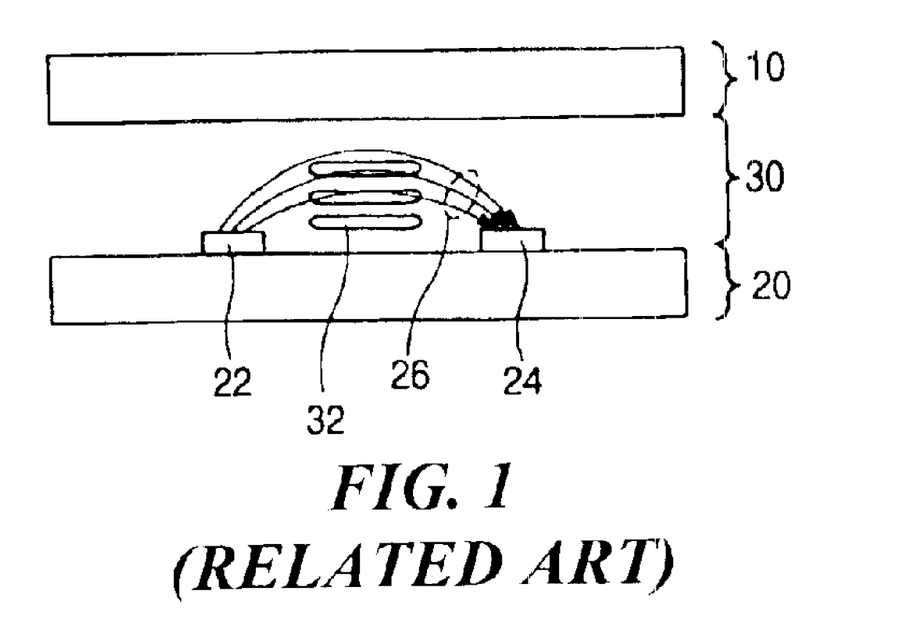
FIG. 1 is a schematic cross-sectional view illustrating a concept of a related art IPS-LCD panel.

FIG. 1 is a schematic cross-sectional view illustrating a concept of a related art IPS-LCD panel. As shown in FIG. 1, upper and lower substrates 10 and 20 are spaced apart from each other, and a liquid crystal layer 30 is interposed therebetween. The upper and lower substrates 10 and 20 are often referred to as an array substrate and a color filter substrate, respectively. On the lower substrate 20 are a common electrode 22 and a pixel electrode 24. The common and pixel electrodes 22 and 24 are aligned parallel to each other. On a surface of the upper substrate 10, a color filter layer (not shown) is commonly positioned between the pixel electrode 24 and the common electrode 22 of the lower substrate 20. A voltage applied across the common and pixel electrodes 22 and 24 produces an electric field 26 through the liquid crystal 32. The liquid crystal 32 has a positive dielectric anisotropy, and thus it aligns parallel to the electric field 26.

Figure 2A:
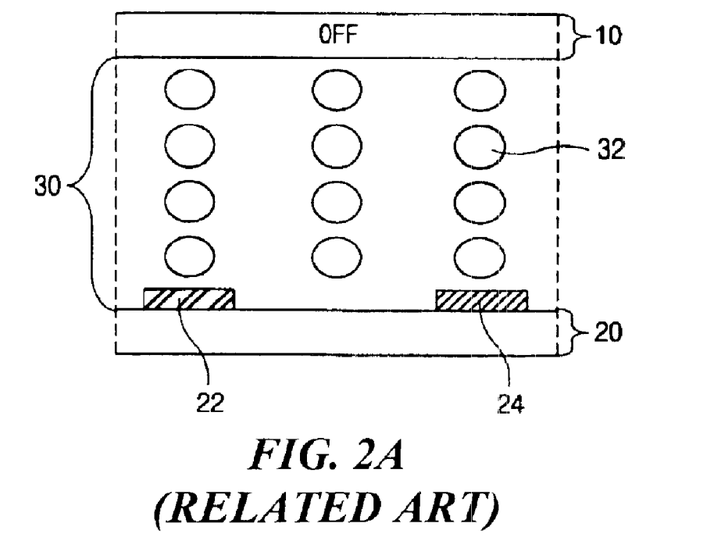
FIGS. 2A and 2B conceptually help illustrate the operation of a related art IPS-LCD device.

FIGS. 2A and 2B conceptually help illustrate the operation of a related art IPS-LCD device. When no electric field is produced by the common and pixel electrodes 22 and 24, i.e., off state, as shown in FIG. 2A, the longitudinal axes of the liquid crystal (LC) molecules 32 are parallel and form a definite angle with the common and pixel electrodes 22 and 24. For example, the longitudinal axes of the LC molecules 32 are arranged parallel with both the common and pixel electrodes 22 and 24.

Figure 2B:
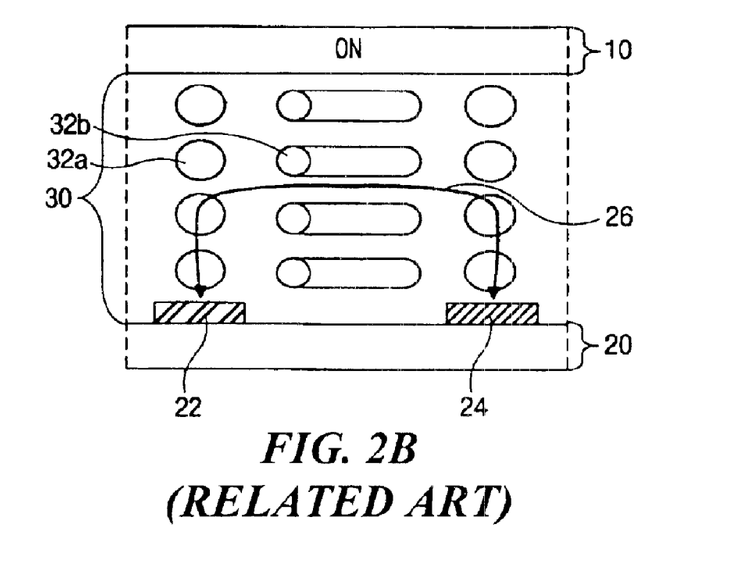

On the contrary, when a voltage is applied to the common and pixel electrodes 22 and 24, i.e., on state, as shown in FIG. 2B, an in-plane electric field 26 that is parallel to the surface of the lower substrate 20 is produced because the common and pixel electrodes 22 and 24 are on the lower substrate 20. Accordingly, the LC molecules 32 are re-arranged to bring their longitudinal axes into coincidence with the electric field. However, the first LC molecules 32a positioned corresponding to (e.g., above) the common and pixel electrodes 22 and 24 do not change their orientation, while the second LC molecules 32b positioned between the common and pixel electrodes 22 and 24 are arranged perpendicular to the common and pixel electrodes 22 and 24. Therefore, the result is a wide viewing angle that ranges from about 80 to 85 degrees in up-and-down and left-and-right sides from a line vertical to the IPS-LCD panel, for example.

Figure 3:
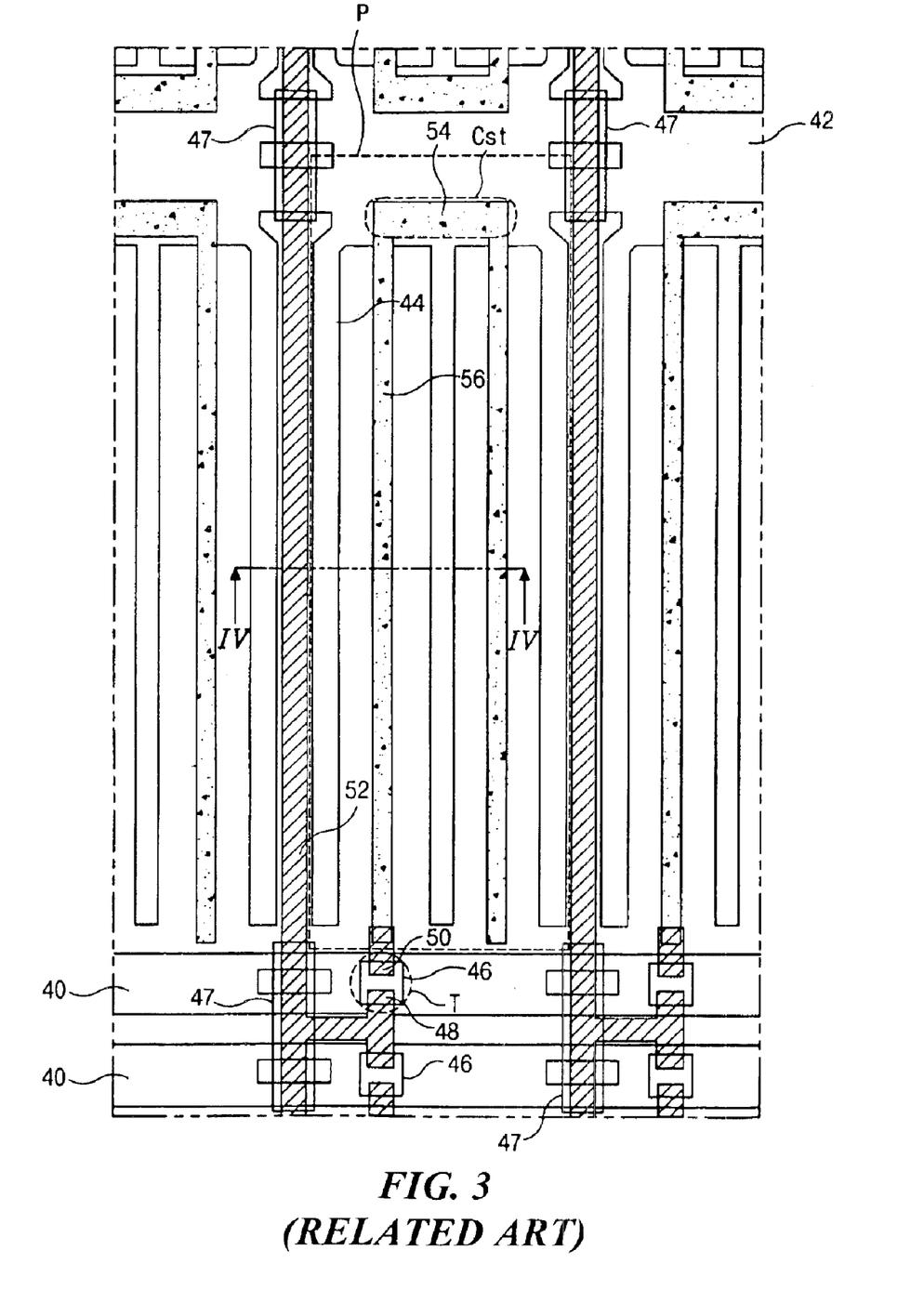
FIG. 3 is a plan view illustrating an array substrate according to a related art IPS-LCD device.

FIG. 3 is a plan view illustrating one pixel of an array substrate according to a related art IPS-LCD device. As shown, gate lines 40 are transversely arranged and data lines 52 are disposed substantially perpendicular to the gate lines 40. A common line 42 is also transversely arranged parallel with the gate line 40. The gate line 40, the common line 42 and a pair of the data lines 52 define a pixel region P on the array substrate. An island-shaped semiconductor layer 46 is positioned near the crossing of the gate and data lines 40 and 52, thereby forming a thin film transistor (TFT) T with a source electrode 48 and a drain electrode 50. A portion of the gate line 40 near the crossing acts as a gate electrode in the TFT T.

In each one pixel, three common electrodes 44 extend from the common line 42, and two of the common electrodes 44 are disposed next to the data lines 52, respectively. A capacitor electrode 54 is disposed over the common line 42, and connects pixel electrodes 56 that are disposed between the common electrodes 44 parallel with the data lines 52. One of the pixel electrodes 56 is electrically connected to the drain electrode 50 of the TFT T. The common line 42, the common electrodes 44 and the gate lines 40 are made of the same opaque material, which has low specific resistance, and maybe formed by the same process. The capacitor electrode 54 and a portion of the common line 42 form a storage capacitor Cst with a dielectric layer interposed therebetween.

In the IPS-LCD device shown in FIG. 3, it is very important that the common electrode 44 should be disposed between the data line 52 and the pixel electrode 56. That is, because an electrical field occurring in the data line 52 affects the pixel electrode 56, cross talk can occur between the data line 52 and the pixel electrode 56 if the pixel electrode 56 is disposed next to the data line 52. The electrical interference between the data line 52 and the pixel electrode 56 causes a decrease of the image quality in the IPS-LCD device.

As mentioned before, the TFT T includes the island-shaped semiconductor layer 46 and the source and drain electrodes 48 and 50 over the semiconductor layer 46. The TFT T also includes the portion of the gate line 40 as a gate electrode. The source electrode 48 extends from the data line 52 and the drain electrode 50 is spaced apart from the source electrode 48. The island-shaped semiconductor layer 46 can be disposed under the gate line 40 in order to protect the island-shaped semiconductor layer 46 from incident light. In the IPS-LCD device shown in FIG. 3, the thin film transistors of the up-and-down neighboring pixel are adjacent to each other and possess the same source electrode jointly. Thus, the source electrode extending from the data line 52 has a "T" shape to be jointly used for the up-and-down neighboring thin film transistors. Semiconductor pattern 47 in the crossing of the data line 52 and the gate lines 40 prevents a short between the data line 52 and each gate line 40. Likewise, the semiconductor pattern 47 in the crossing of the data line 52 and the common line 42 prevents a short between the data line 52 and the common electrode 44.

Figure 4:
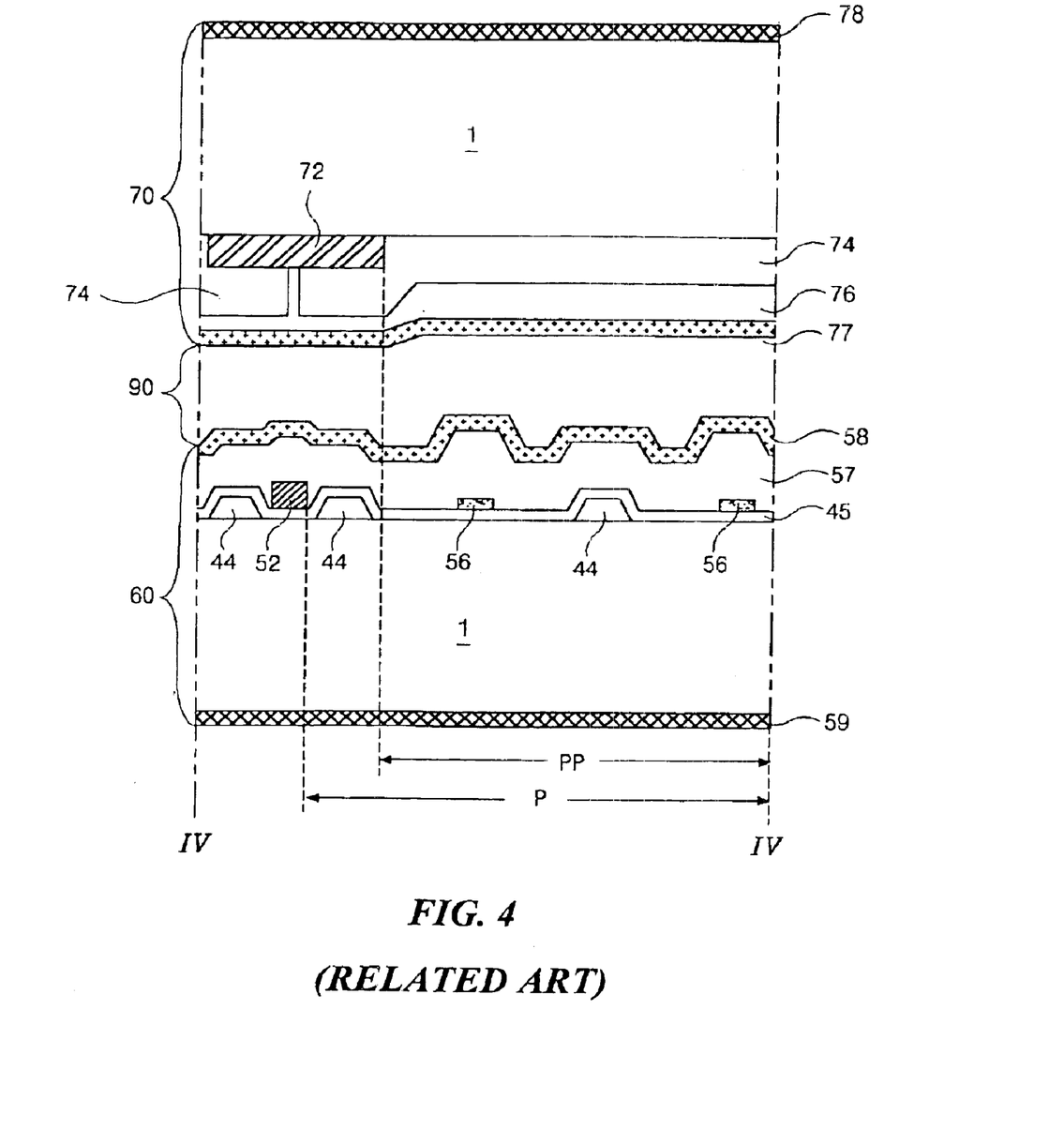
FIG. 4 is a cross-sectional view taken along line IV—IV of FIG. 3 and illustrates lower and upper substrates of the related art IPS-LCD device.

FIG. 4 is a cross-sectional view taken along line IV—IV of FIG. 3 and illustrates lower and upper substrates of the related art IPS-LCD device. As shown, lower and upper substrates 60 and 70 are spaced apart from and face to each other. A liquid crystal layer 90 is interposed between the lower and upper substrates 60 and 70. The pixel region P is defined with respect to the lower substrate 60 and an aperture PP that is substantially the display area is defined with respect to the lower and upper substrates 60 and 70.

On the lower substrate 60, a plurality of common electrodes 44 are disposed in the pixel region P on a transparent substrate 1. A gate insulation layer 45 is formed on the transparent substrate 1 while covering the plurality of common electrodes 44. The data line 52 is disposed on the gate insulation layer 45 between the common electrode 44 of one pixel region and the common electrode 44 of the other pixel region. A plurality of pixel electrodes 56 are formed on the gate insulation layer 45, and each pixel electrode 56 is disposed between two common electrodes 44. The common electrodes 44 and the pixel electrodes 56 are located in an alternate manner in the pixel region P. A passivation layer 57 is formed on the gate insulation layer 45 to cover the data line 52 and the plurality of pixel electrodes 56.

On the upper substrate 70, a black matrix 72 is disposed on the rear surface (the side facing the lower substrate) of a transparent substrate 1 in a position corresponding to the data line 52 and the adjacent common electrodes 44. A color filter layer 74 having red, green and blue colors is disposed on the rear surface of the transparent substrate 1 to cover portions of the black matrix 72. An overcoat layer 76 is disposed on the color filter layer 74. The overcoat layer 76 planarizes the rear surface of the upper substrate 70 and protects the liquid crystal layer 90 from the dye or pigment included in the color filter layer 74.

Lower and upper orientation films 58 and 77 are disposed on the inner surfaces of the lower and upper substrates 60 and 70, respectively, in order to align the liquid crystals of the liquid crystal layer 90. Thus, the lower orientation film 58 is between the passivation layer 57 and the liquid crystal layer 90, and the upper orientation film 77 is between the overcoat layer 76 and the liquid crystal layer 90. Furthermore, lower and upper polarizers 59 and 78 are formed on the outer surfaces of the lower and upper substrates 60 and 70, respectively.

However, the related art IPS-LCD device shown in FIGS. 3 and 4 has some problems. Since the common electrode 44 disposed in the center of the pixel region P is made of the opaque metal, the aperture ratio is low. Further, since the capacitor electrode and the portion of the common line only form the storage capacitor, the capacitance of the storage capacitor is too low to be enough.

SUMMARY OF THE INVENTION

Accordingly, the present invention is directed to an array substrate for an IPS-LCD device that substantially obviates one or more of the problems due to limitations and disadvantages of the related art.

An advantage of the present invention is to provide an array substrate for use in an IPS-LCD device that increases aperture ratio in a pixel region.

Another advantage of the present invention is to provide an array substrate for use in an IPS-LCD device that provides a storage capacitor with an increased capacitance.

Additional features and advantages of the invention will be set forth in the description which follows and in part will be apparent from the description, or may be learned by practice of the invention. These and other advantages of the invention will be realized and attained by the structure particularly pointed out in the written description and claims hereof as well as the appended drawings.

To achieve these and other advantages, an embodiment in accordance with the principles of the present invention provides an array substrate for in-plane switching liquid crystal display device. The array substrate includes a gate line arranged in a transverse direction on a substrate; a data line arranged in a direction substantially perpendicular to the gate line; a thin film transistor at a crossing of the gate line and the data line; a common line arranged in the transverse direction; first and second common electrodes extending from the common electrode, one of the first and second electrodes disposed adjacent to the data line; a third common electrode disposed between the first and second common electrodes and formed of a transparent conductive material; a common electrode connector extending from the third common electrode to one of the first and second common electrodes; a plurality of pixel electrodes between the common electrodes, at least one of the plurality of pixel electrodes crossing the common line and contacting the thin film transistor through a second contact hole, the plurality of pixel electrodes formed of the same material as the third common electrode; and a pixel electrode connector over the gate line, the pixel electrode connector connecting the plurality of pixel electrodes. The thin film transistor includes a gate electrode that extends from the gate line, a semiconductor layer that overlaps the gate electrode, a source electrode that extends from the data line, and a drain electrode that is spaced apart from the source electrode.

The array substrate further includes a capacitor electrode over the common line. The capacitor electrode is connected to the thin film transistor. The capacitor electrode forms a first storage capacitor with a portion of the common line while the pixel electrode connector forms a second storage capacitor with a portion of the gate line. The gate line, the common line and the first and second common electrodes are formed of the same material, such as an opaque metal having a low specific resistance, at the same time. Moreover, the gate line, the common line and the first and second common electrodes is a double-layered structure including aluminum neodymium (AlNd) as a first layer. The transparent conductive material is indium tin oxide.

In the array substrate according to the present invention, the common electrode connector has a T-shape and is disposed over the common line and over one of the first and second common electrodes. A head of the T-shaped common electrode is disposed over the one of the first and second common electrodes. A body of the T-shaped common electrode is disposed over the common line and has a width ranging from about 3 to about 5 micrometers ($\mu$m). The head of the T-shaped common electrode contacts one of the first and second common electrodes through the first contact hole. The first, second and third common electrodes are parallel with the data line. The common electrode connector are formed of the same material as the third common electrode. The common line is disposed in the middle of a pixel region that is defined by the gate and data lines. The first and second common electrodes extend up-and-down direction from the common line. The pixel electrode connector is formed of the same material as the third common electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate an embodiment of the present invention and together with the description serve to explain the principles of that invention.

In the drawings.

DETAILED DESCRIPTION OF THE ILLUSTRATED EMBODIMENTS

Reference will now be made in detail to an illustrated embodiment of the present invention, examples of which are shown in the accompanying drawings. Wherever possible, similar reference numbers will be used throughout the drawings to refer to the same or similar parts.

Figure 5:
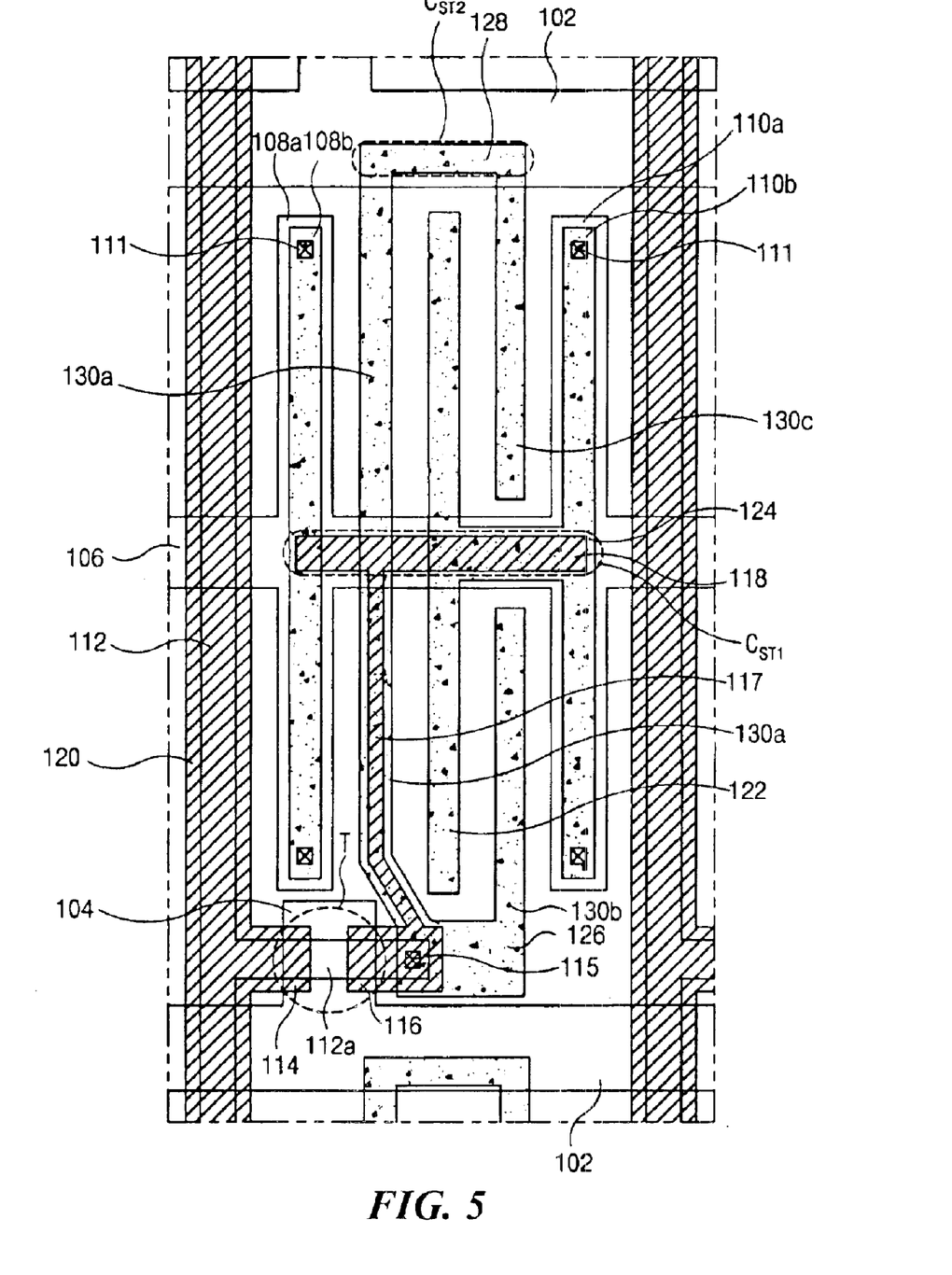
FIG. 5 is a plan view illustrating an array substrate according to a first embodiment of the present invention.

FIG. 5 is a schematic plan view illustrating one pixel of an array substrate of an IPS-LCD according to a first embodiment of the present invention.

As shown, gate lines 102 are transversely arranged and data lines 120 are disposed substantially perpendicular to the gate lines 102. A pair of gate and data lines 102 and 120 define a pixel region on the array substrate. A thin film transistor (TFT) T is disposed near the crossing of the gate and data lines 102 and 120. The TFT T includes a gate electrode 104 that protrudes from the gate line 102, a source electrode 114 that extends from the data line 120, and a drain electrode 116 that is spaced apart from the source electrode 114. The TFT T further includes a semiconductor layer 112a extending from a semiconductor line 112 that is disposed corresponding to the data line 120. Namely, the semiconductor line 112 has the same pattern as the data line 120, and the semiconductor layer 112a extends from the semiconductor line 112 over the gate electrode 104. Since the semiconductor line 112 is disposed under the data line 120, it acts as a buffer layer and helps to adhere the data line 120 to the substrate. Although not shown in FIG. 5, a black matrix protects the semiconductor layer 112a of the TFT T from incident light.

Still referring to FIG. 5, a common line 106 is disposed substantially parallel with the gate lines 102 in the pixel region between two adjacent gate lines 102. In the exemplary IPS-LCD shown in FIG. 5, the common line 106 is roughly in the middle of the pixel region. First and second common electrodes 108a and 110a extend from the common line 106 in an up-and-down direction (in the context of the figures) substantially parallel with the data lines 120. The gate lines 102, the gate electrode 104, the common line 106 and the first and second common electrodes 108a and 10a may be formed at the same time using an opaque metal having a low specific resistance. Beneficially, the gate and common lines and electrodes can have a double-layered structure of molybdenum (Mo)/aluminum neodymium (AlNd).

Over the first and second common electrode 108a and 110a, first and second auxiliary common electrodes 108b and 110b are disposed with a passivation layer (not shown) between the first and second common electrodes 108a and the first and second auxiliary common electrodes 108b and 10b. The first and second auxiliary common electrodes 108b and 10b are made of a transparent conductive material, such as indium tin oxide, for example, and has substantially the same shape as the first and second common electrodes 108a and 10a. Thus, the first and second auxiliary common electrodes 108b and 110b substantially perpendicularly cross the common line 106 and are substantially parallel with the data lines 120. Moreover, the first and second auxiliary common electrodes 108b and 110b contacts the first and second common electrodes 108a and 110a through contact holes 111 through the passivation layer (not shown) that may be formed at both ends of each auxiliary common electrode. In the middle of the pixel region, a third common electrode 122 is disposed substantially perpendicular to both the first and second auxiliary common electrodes 108b and 110b. The third common electrode 122 is made of the same material as the first and second auxiliary common electrodes 108b and 110b, for example, indium tin oxide, may be formed at the same time as the first and second common auxiliary electrodes 108b and 110b, and may have the same shape as the first and second auxiliary common electrodes 108b and 110b. The third common electrode 122 and the second auxiliary common electrode 10b are connected by a common electrode connector 124 that is disposed over and substantially parallel with the common line 106.

Still referring to FIG. 5, first, second and third pixel electrodes 130a, 130b and 130c are disposed parallel with the common electrodes. The first pixel electrode 130a is between the first and third common electrodes 108a and 122, and the second and third pixel electrodes 130b and 130c are between the second and third common electrodes 110a and 122. The first pixel electrode 130a crosses the common line 106, but the second and third pixel electrodes 130b and 130c do not cross the common line 106. A first pixel electrode connector 126 is disposed next to the TFT T and connects the first pixel electrode 130a to the second pixel electrode 130b. The first pixel electrode connector 126 also contacts the drain electrode 116 through a drain contact hole 115. A second pixel electrode connector 128 is disposed over the gate line 102 and connects the first pixel electrode 130a to the third pixel electrode 130c. The pixel electrodes 130a, 130b and 130c and the pixel electrode connectors 126 and 128 are made of the same material as the third common electrode 122, for example, indium tin oxide, and may be formed with the third common electrode 122 at the same time.

The IPS-LCD device shown in FIG. 5 includes a capacitor electrode 118 that is disposed over the common line 106. The capacitor electrode 118 is connected to the drain electrode 116 through a connector 117 that has the same pattern as the first pixel electrode 130a. The capacitor electrode 118 and the common line 106 form a first storage capacitor $C_{ST1}$ with a dielectric layer therebetween, and the second pixel electrode connector 128 and the gate line 102 form a second storage capacitor $C_{ST2}$ with a dielectric layer therebetween.

In the IPS-LCD device shown in FIG. 5, since the third common electrode that is in the the pixel region is made of the transparent conductive material, the aperture ratio can be raised. Further, since the IPS-LCD device shown in FIG. 5 has the first and second storage capacitor, it can have an improved capacitance.

Figure 6:
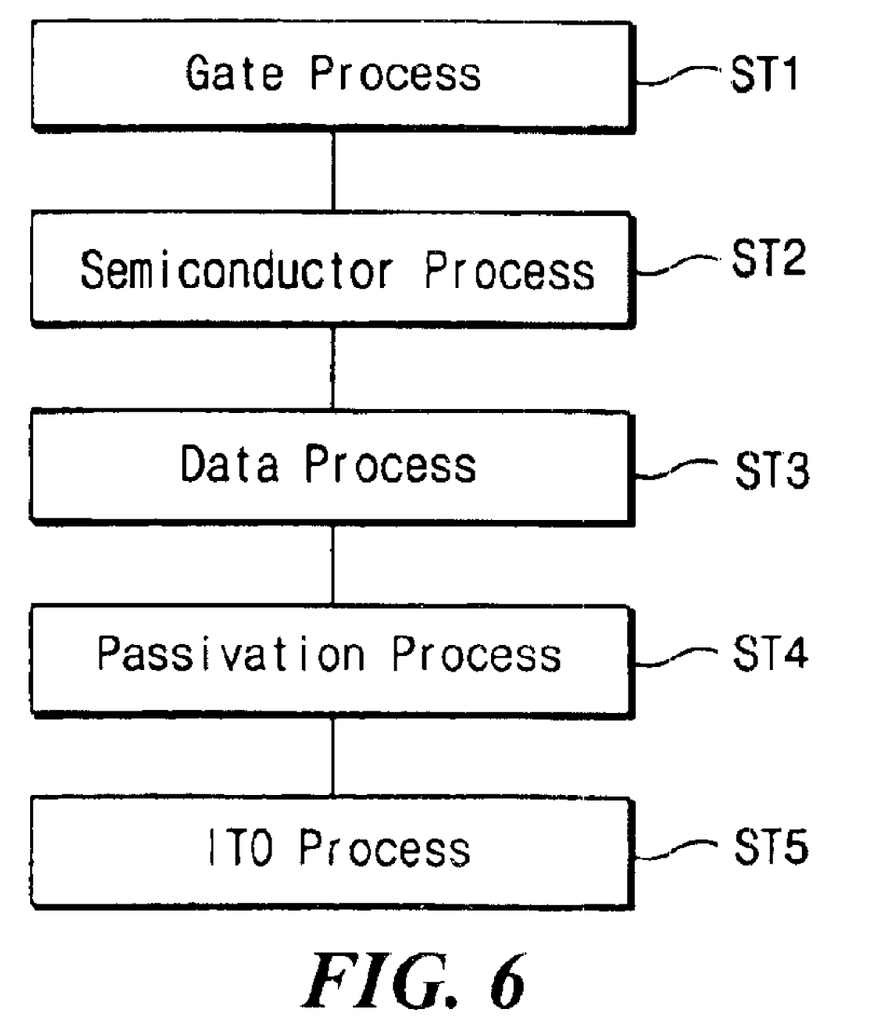
FIG. 6 is a flow chart illustrating process steps of forming the array substrate of FIG. 5.

The detailed explanation of forming the IPS-LCD device shown in FIG. 5 will be presented with reference to FIG. 6.

FIG. 6 is a flow chart illustrating process steps of forming the array substrate of FIG. 5. In step ST1, an opaque metallic material having a low specific resistance is deposited on a transparent substrate, and then patterned through a first mask process that includes exposure, development and etch. Thus, the gate line, the gate electrode, the common line and the first and second common electrodes are formed on the transparent substrate.

In step ST2, a gate insulation layer, an amorphous silicon (a-Si) layer and an impurity-included amorphous silicon layer (n+ a-Si) are sequentially formed on the transparent substrate having the patterned metal layer. The gate insulation layer is silicon nitride ($SiN_X$). Thereafter, the amorphous silicon (a-Si) layer and the impurity-included amorphous silicon layer (n+ a-Si) are patterned using a second mask process, thereby forming semiconductor line 112 (in FIG. 5) and the semiconductor layer 112a (in FIG. 5). The semiconductor layer 112a includes an active layer of amorphous silicon and an ohmic contact layer of impurity-included amorphous silicon. As mentioned with reference to FIG. 5, the semiconductor line 112 has the same pattern as the data line, and the semiconductor layer 112a extends over the gate electrode 104.

In step ST3, a metallic material having good corrosion-resistant characteristics, such as molybdenum (Mo), for example, is deposited and then patterned using a third mask process. Thus, the data line 120, the source electrode 114, the drain electrode 116, the capacitor electrode 118, and the connector 117, as shown in FIG. 5 are formed. The data line 120 is substantially perpendicular to both the gate line 102 and the common line 106; the source electrode 114 extends from the data line 120; and the drain electrode 116 is spaced apart from the source electrode 114. The capacitor electrode 118 is disposed corresponding in position to the common line 106. The connector 117 connects the drain electrode 116 to the capacitor electrode 118.

In step ST4, a passivation layer is formed over the transparent substrate after being processed through the steps ST1–ST2. The passivation layer is an organic material, such as benzocyclobutene (BCB), or an inorganic material, such as silicon nitride or silicon oxide. Thereafter, a fourth mask process is performed, thereby forming the contact holes 111 through the passivation layer (not shown) and the drain contact hole 115 through the passivation layer (not shown), as shown in FIG. 5. The contact holes 111 are formed to correspond to the ends of the first and second common electrodes 108a and 110a and expose portion of the first and second common electrodes 108a and 110a through the passivation layer. Likewise, the drain contact hole 115 exposes a portion of the drain electrode 116.

In step ST5, a transparent conductive material, e.g., indium tin oxide (ITO), is deposited on the passivation layer and then patterned using a fifth mask process, thereby forming the pixel electrodes 130a, 130b and 130c, the pixel electrode connectors 126 and 128, the third common electrode 122, the first and second auxiliary common electrodes 108b and 110b, and the common electrode connector 124, as shown in FIG. 5. The first pixel electrode connector 126 contacts the drain electrode 116 through the drain contact hole 115, and connects one end of the first pixel electrode 130a to the second pixel electrode 130b. The second pixel electrode connector 128 is disposed above the gate line 102 and connects the other end of the first pixel electrode 130a to the third pixel electrode 130c. The first and second auxiliary common electrodes 108b and 110b has the same pattern shape as the first and second common electrodes 108a and 110a, and are formed above the first and second common electrodes 108a and 110a to correspond to the first and second common electrodes 108a and 110a. As shown in FIG. 5, the first and second auxiliary common electrodes 108b and 110b contact the first and second common electrodes 108a and 110a, respectively, through the contact holes 111. The third common electrode 122 is disposed in the the pixel region between the first pixel electrode 130a and the second and third pixel electrodes 130b and 130c. The common electrode connector 124 is disposed over the common line 106 between the third common electrode 122 and the second auxiliary common electrode 110b so that it connects the third common electrode 122 to the second auxiliary common electrode 110b.

In the aforementioned process steps of forming the array substrate for use in the IPS-LCD device, the metallic materials, the insulating materials and the semi-conducting materials are formed and patterned repeatedly using the masks. Therefore, after being patterned, the remainder of these material may be left and cause a short between the patterned conductive materials. Especially, the data line is adjacent to the common electrodes and the common electrodes next to the data line have a double-layered structure of opaque metal and ITO. Thus, the chances of short circuit between the data line and the common electrodes is high. Furthermore, since the capacitor electrode and the common electrode connector are formed above the common line, the capacitor electrode may easily short-circuit with the common electrode connector.

Accordingly to overcome the disadvantages of the first embodiment of the present invention, another example is presented.

Figure 7:
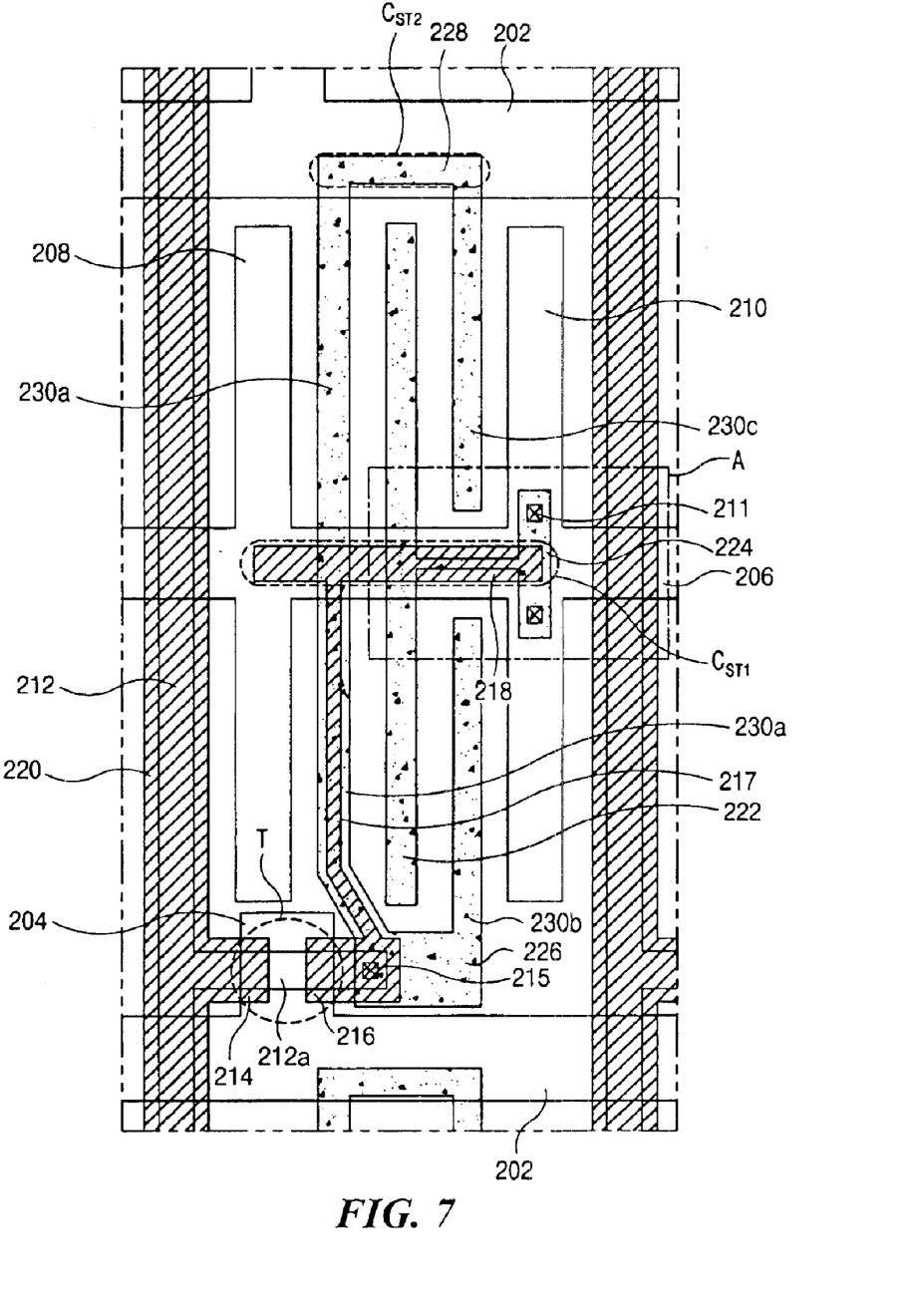
FIG. 7 is a plan view illustrating an array substrate according to a second embodiment of the present invention.
Figure 8:
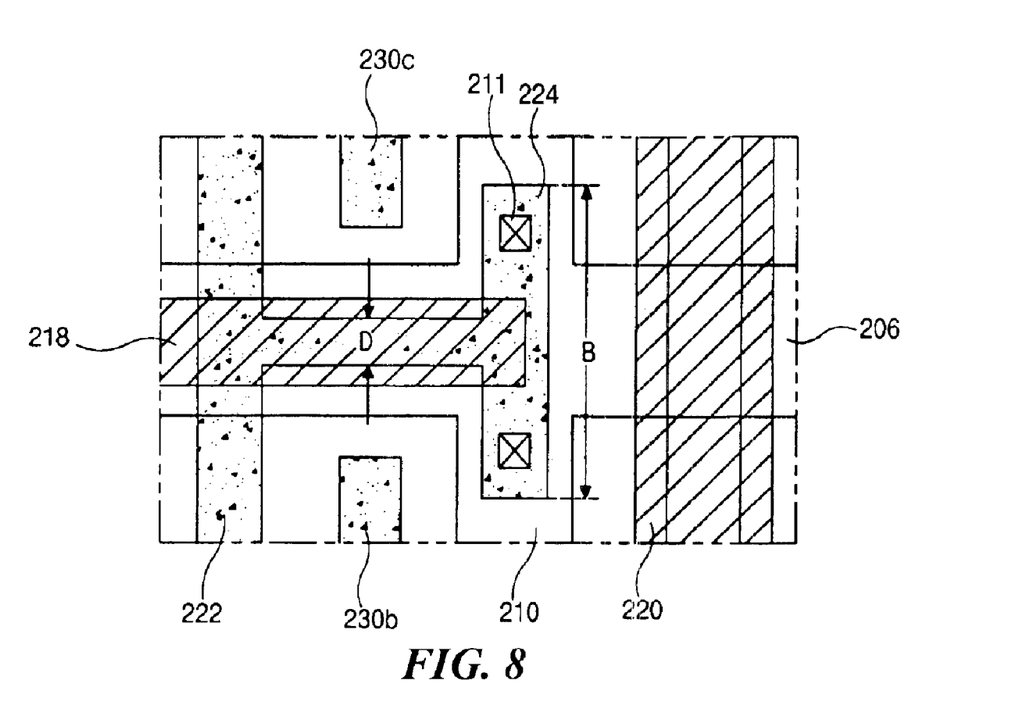
FIG. 8 is an enlarged plan view illustrating a portion A of FIG. 7.

FIG. 7 is a plan view illustrating an array substrate according to a second embodiment of the present invention, and FIG. 8 is an enlarged plan view illustrating a portion A of FIG. 7.

The IPS-LCD device shown in FIGS. 7 and 8 has structure and configuration similar to that shown in FIG. 5, but has some differences. As shown in FIGS. 7 and 8, the first and second auxiliary common electrodes 108b and 110b of the first embodiment not present in the second embodiment of the present invention. Further, the common electrode connector 224 of the second embodiment has a shape different from that of the first embodiment.

Referring to FIGS. 7 and 8, gate lines 202 are transversely arranged and data lines 220 are disposed substantially perpendicular to the gate lines 202. A pair of gate and data lines 202 and 220 define a pixel region on the array substrate. A thin film transistor (TFT) T is disposed near the crossing of the gate and data lines 202 and 220. The TFT T includes a gate electrode 204 that protrude from the gate line 202, a source electrode 214 that extends from the data line 220, and a drain electrode 216 that is spaced apart from the source electrode 214. The TFT T further includes a semiconductor layer 212a extending from a semiconductor line 212 that is disposed corresponding to the data line 220. Namely, the semiconductor line 212 has the same pattern as the data line 220, and the semiconductor layer 212a extends from the semiconductor line 212 over the gate electrode 204. Since the semiconductor line 212 is disposed under the data line 220, it acts as a buffer layer and helps to adhere the data line 220 to the substrate.

Still referring to FIGS. 7 and 8, a common line 206 is disposed parallel with the gate lines 202 in the pixel region. In the exemplary IPS-LCD of FIGS. 7 and 8, the common line 206 is roughly in the middle of the pixel region. First and second common electrodes 208 and 210 extend from the common line 206 in up-and-down directions parallel with the data lines 220. The gate lines 202, the gate electrode 204, the common line 206 and the first and second common electrodes 208 and 210 may be formed at the same time using an opaque metal having a low specific resistance. Beneficially, the gate and common lines and electrodes can have a double-layered structure of molybdenum (Mo)/aluminum neodymium (AlNd).

In the middle of the pixel region, a third common electrode 222 is disposed substantially perpendicular to both the first and second common electrodes 208 and 210, and crosses the common line 206. The third common electrode 222 is made of a transparent conductive material, e.g., indium tin oxide, and has substantially the same shape as the first and second common electrodes 208 and 210. The third common electrode 222 has a common electrode connector 224. As shown in FIGS. 7 and 8, the common electrode connector 224 protrudes from the third common electrode 222 to the second common electrode 210, and has a T-shaped configuration. The T-shaped common electrode connector 224 is disposed over the common line 206 extends over the second common electrode 210. In overlapped portions of the T-shaped common electrode connector 224 and the second common electrode 210, there are contact holes 211 through an insulator (not shown) so that the T-shaped common electrode connector 224 contacts the second common electrode 210 through the contact hole 211. Although the common electrode connector 224 has the T-shape in the illustrated second embodiment, the common electrode connector 224 can have various other shapes, e.g., an L-shape. Further, the contact holes 211 can be formed in various spots depending on the common electrode connector's shape. Accordingly, the third common electrode 222 is electrically connected to the other common electrodes 208 and 210 and the common line 206.

Still referring to FIG. 7, first, second and third pixel electrodes 230a, 230b and 230c are disposed parallel with the common electrodes. The first pixel electrode 230a is between the first and third common electrodes 208 and 222, and the second and third pixel electrodes 230b and 230c are between the second and third common electrodes 210 and 222. The first pixel electrode 230a crosses the common line 206, but the second and third pixel electrodes 230b and 230c do not cross the common line 206. The second pixel electrode 230b is located in a first portion (the bottom portion in the context of the figures) of the pixel region, and the third pixel electrode 230c is located in a second portion (the bottom portion in the context of the figures) of the pixel region. A first pixel electrode connector 226 is disposed next to the TFT T and connects the first pixel electrode 230a to the second pixel electrode 230b. The first pixel electrode connector 226 also contacts the drain electrode 216 through a drain contact hole 215 that is formed through a passivation layer (not shown). A second pixel electrode connector 228 is disposed over the gate line 202 and connects the first pixel electrode 230a to the third pixel electrode 230c. The pixel electrodes 230a, 230b and 230c and the pixel electrode connectors 226 and 228 may be formed with the third common electrode 222 at the same time, so that they are made of the same material as the third common electrode 222, for example, indium tin oxide.

The IPS-LCD device shown in FIG. 7 also includes a capacitor electrode 218 that is disposed over the common line 206. The capacitor electrode 218 is connected to the drain electrode 216 through a connector 217 that has the same pattern as the first pixel electrode 230a. The capacitor electrode 218 and the connector 217 are formed with the data lines 220 in a mask process. The capacitor electrode 218 and common line 206 form a first storage capacitor $C_{ST1}$ with a dielectric layer therebetween, and the second pixel electrode connector 228 and the gate line 202 form a second storage capacitor $C_{ST2}$ with a dielectric layer therebetween.

FIG. 8 is an enlarged plan view illustrating a portion A of FIG. 7. As shown, the common electrode connector 224 protrudes in a horizontal direction (in the context fo the figure) from the third common electrode 222, and then extends by a length B in a longitudinal direction substantially parallel with the data line 220. Thus, the common electrode connector 224 overlaps the common line 206 and the second common electrode 210, thereby forming the T-shape. The common electrode connector 224 contacts the second common electrode 210 through the contact holes 211. It is important in the second embodiment that the head of the common electrode connector 224, which has the length B, should be minimized. Furthermore, the body of the common electrode connector 224, which is a portion over the common line 206, has a width D that is smaller than that of the capacitor electrode 218. The width D of the common electrode connector 224 in the second embodiment is much smaller than that in the first embodiment. In the second embodiment, the thinner the width D is, the better the common electrode connector is made. Namely, the width D of the common electrode connector 224 is minimized as much as it can.

Compared to the first embodiment, in the second embodiment the array substrate does not have the auxiliary common electrodes and the common electrode connector has a different shape. Namely, the common electrodes 208 and 210 next to the data lines has a single-layered structure that is formed of the same material as the gate line 202, and the size of the common electrode connector 224 is minimized so as to minimize the overlapping area with the capacitor electrode 218 and the common line 206.

Accordingly, since the auxiliary common electrode is not formed next to the data lines, the chance of short circuit between the data lines and the common electrodes decreases. Also, the probability of short circuit between the capacitor electrode and the common electrode connector is minimized. For example, the common electrode connector 124 of FIG. 5 in the first embodiment may have a width of about 13 micrometers ($\mu$m), while the common electrode connector 224 of FIGS. 7 and 8 in the second embodiment has a width D ranging from about 3–5 micrometers ($\mu$m). Moreover, it is easily achieved that the common electrode connector 224 can have a minimum size because the common electrode connector 224 is made of the transparent conductive material, e.g., indium tin oxide, and the transparent conductive material can be patterned in a narrow size more easily than the opaque metallic material.

According to the present invention, the high aperture ratio become clear from the detailed description and examples which are alluded before, because some of the common electrodes are made of the transparent conductive material, e.g., ITO. Further, since two storage capacitors are equipped in the pixel region and in the gate line, respectively, the IPS-LCD device can be operated more stably.

It will be apparent to those skilled in the art that various modifications and variation can be made in the array substrate of the present invention without departing from the spirit or scope of the invention. Thus, it is intended that the present invention cover the modifications and variations of this invention provided they come within the scope of the appended claims and their equivalents.

What is claimed is:

1. An array substrate for in-plane switching liquid crystal display device, comprising:
   a gate line arranged in a transverse direction on a substrate;
   a data line arranged in a direction substantially perpendicular to the gate line;
   a thin film transistor at a crossing of the gate line and the data line;
   a common line arranged in the transverse direction;
   first and second common electrodes extending from the common line, one of the first and second common electrodes disposed adjacent to the data line;
   a third common electrode disposed between the first and second common electrodes and formed of a transparent conductive material;
   a common electrode connector extending from the third common electrode to one of the first and second common electrodes;
   a plurality of pixel electrodes between the common electrodes, at least one of the plurality of pixel electrodes crossing the common line and contacting the thin film transistor through a second contact hole, the plurality of pixel electrodes formed of the same material as the third common electrode; and
   a pixel electrode connector over the gate line, the pixel electrode connector connecting the plurality of pixel electrodes.

2. The array substrate of claim 1, wherein the thin film transistor includes a gate electrode extending from the gate line, a semiconductor layer overlapping the gate electrode, a source electrode extending from the data line, and a drain electrode spaced apart from the source electrode.

3. The array substrate of claim 1, further comprising a capacitor electrode over the common line.

4. The array substrate of claim 3, wherein the capacitor electrode is connected to the thin film transistor.

5. The array substrate of claim 4, wherein the capacitor electrode forms a first storage capacitor with a portion of the common line and the pixel electrode connector forms a second storage capacitor with a portion of the gate line.

6. The array substrate of claim 1, wherein the gate line, the common line and the first and second common electrodes are of the same material.

7. The array substrate of claim 6, wherein the gate line, the common line and the first and second common electrodes are formed of an opaque metal having a low specific resistance.

8. The array substrate of claim 7, wherein the gate line, the common line and the first and second common electrodes is a double-layered structure including aluminum neodymium (AlNd) as a first layer.

9. The array substrate of claim 1, wherein the transparent conductive material is indium tin oxide.

10. The array substrate of claim 1, further comprising a gate insulating layer over the first and second common electrodes.

11. The array substrate of claim 10, wherein the common electrode connector contacts one of the first and second electrodes through a first contact hole in the gate insulating layer.

12. The array substrate of claim 1, wherein the common electrode connector has a T-shape and is disposed over the common line and over one of the first and second common electrodes.

13. The array substrate of claim 12, wherein a head of the T-shaped common electrode connector is disposed over the one of the first and second common electrodes.

14. The array substrate of claim 12, wherein a body of the T-shaped common electrode connector is disposed over the common line and has a width ranging from about 3 to about 5 micrometers ($\mu$m).

15. The array substrate of claim 1, further comprising a gate insulating layer over the first and second common electrodes.

16. The array substrate of claim 15, wherein a head of a T-shaped common electrode contacts one of the first and second common electrodes through a first contact hole in the gate insulating layer.

17. The array substrate of claim 1, wherein the first, second and third common electrodes are substantially parallel with the data line.

18. The array substrate of claim 1, wherein the common electrode connector is formed of the same material as the third common electrode.

19. The array substrate of claim 1, wherein the common line is disposed in the middle of a pixel region that is defined by the gate and data lines.

20. The array substrate of claim 1, wherein the first and second common electrodes extend up-and-down from the common line.

21. The array substrate of claim 1, wherein the pixel electrode connector is of the same material as the third common electrode.

* * * * *